JOHN A. BALL.

Improvement in Chain-Elevator and Bucket.

No. 4,947. Reissued June 18, 1872.

Witnesses.

D. R. Cowl

Alonzo Hughes

Inventor.

Jno. A. Ball by his Attys

A. H. & R. K. Evans.

AM. PHOTO-LITHOGRAPHIC CO. N.Y. (OSBORNE'S PROCESS.)

UNITED STATES PATENT OFFICE.

JOHN A. BALL, OF GRASS VALLEY, CALIFORNIA.

IMPROVEMENT IN CHAIN-ELEVATORS AND BUCKETS.

Specification forming part of Letters Patent No. 96,866, dated November 16, 1869; reissue No. 4,947, dated June 18, 1872.

SPECIFICATION.

*To all whom it may concern:*

Be it known that I, JOHN AUGUSTUS BALL, of Grass Valley, in the county of Nevada and State of California, have invented certain new and useful Improvements in Endless-Chain Elevators and Buckets; and I do hereby declare that the following is a full and exact description of the same, reference being had to the accompanying drawing and to the letters of reference marked thereon.

The nature of my invention consists principally of a device for opening and closing elevator-buckets at the proper time for discharging their contents, which works automatically by means of jointed arms and the peculiar construction and attachment of the buckets to the endless chain or belts. My device may be employed for elevating grain in storehouses, mud in dredging, sand in excavating, earth in ditching, and for other purposes when a self-charging and discharging bucket is wanted.

Figure 1:
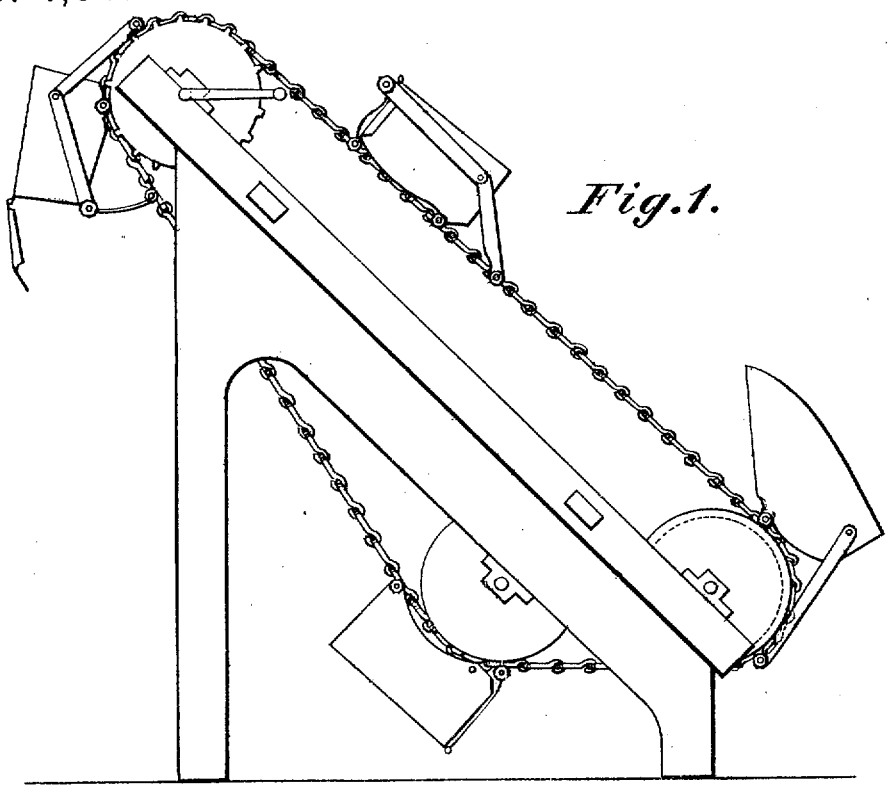
Figure 2:
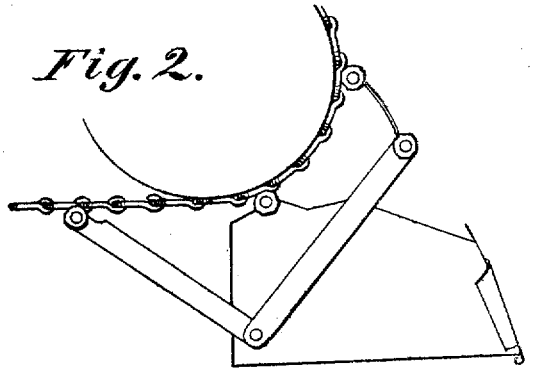
Figure 3:
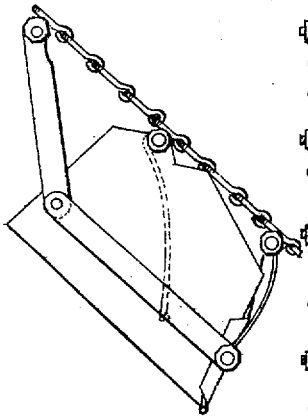
Figure 4:
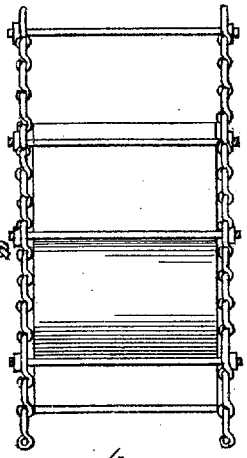

Referring to the accompanying drawing, Figure 1 is a side elevation. Fig. 2 is a side elevation, showing bucket passing around the lower drum. Fig. 3 is a side elevation of the bucket. Fig. 4 is a back view of bucket.

The frame A is herein represented as placed at an inclination, and at each end are attached pulleys or drums B B′. The lower drum B′ I construct larger in diameter than that of the upper one, so that the hinged gate of the bucket will not open when passing around its arc, and is provided with grooves C C at each end. The upper drum has also grooves with projections *a a*, between which the links of the endless chain D D enter as the machine is revolved. A drum, E, which is also grooved, is attached to the under side of the frame, over which the chains and buckets pass in their revolutions. This drum may be raised or lowered to give a greater or less sweep to the bucket. One side of each of the buckets is attached to the chains at *b′* by a proper joint, and links *d d* connect the chain with the buckets near their outer side, as shown, so that when the buckets arrive at the upper pulley the upper link *d* will draw upon the point of attachment near the outer side and cause the bucket to tilt to the proper position to discharge its load. This movement of the bucket also disengages the discharging-door or bottom F, so as to allow it to automatically discharge the load. After discharging its load the bucket passes over the pulley B, the door F resumes its position, and is locked automatically by the link *d* as it resumes its position in line with the chain and bucket. By connecting the buckets to the chains D at a point below their middle lines or centers the effect of the upper arm *d* will be to retain the bucket in a vertical position for an instant after the arm moves upon and over the pulley, and in some instances I will then connect them and operate the discharge door or opening by this movement.

The principal feature of my invention is the link or connection *d*, by which the bucket is adjusted while it discharges its load, and which, by its action in thus holding the bucket, also trips, lifts, or otherwise opens the discharging door or end through which the load escapes from the bucket at the proper instant. It also keeps the buckets suspended from the chain in the proper position while they are moving between the drums. Generally I suspend the buckets at the end of arms equivalent to *d*, which shall connect it with the chains D upon its opposite sides. The point at which this rod connects with the bucket should be below the center to insure perfect action, while the link represented by *d* will be connected with it above the center, thus providing two points of support, and allowing the link to control the movement of the bucket in passing over the upper pulley. In the drawing I have shown four methods of attaching the buckets to the chains, in three of which this link is applied for the purpose above described; but its application is not limited to the devices shown, as numerous ways of hanging the buckets to the chains can be applied so as to permit of its being operated automatically by the link. When employing these buckets for lifting the lower pulleys or drums E, B′ can be dispensed with and the chain be allowed to hang in the water in the well. The weight of the chain and buckets will then keep it in place.

Having thus described my invention, what I claim, and desire to secure by Letters Patent, is—

1. The upper link *d* in combination with the attachment *b'* of the bucket to the chain, whether said attachment *b'* is made above or below the middle line or center of the buckets, substantially as and for the purpose above described.

2. Operating elevator-buckets by means of the rods *b b' b'' c* and the jointed arms *d d*, which automatically raise and lower the guard and guard-rods at the proper point, in combination with the flap-door F, guard F, and said guard-rod *c*, the whole constructed and arranged substantially as described.

In witness whereof I have hereunto set my hand.

JOHN A. BALL.

Witnesses:
M. M. EVANS,
JAMES STEVENSON.